Figure 1:
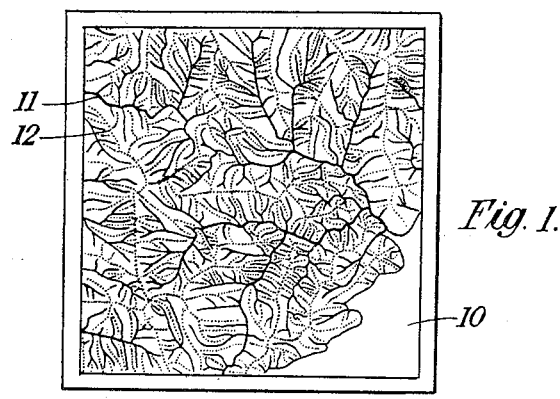

Feb. 26, 1963 A. E. GOODSON 3,078,598
PROCESS FOR MAKING RELIEF MAPS
Filed Sept. 7, 1960

Albert Ernest Goodson
Inventor
By Cushman, Darby & Cushman
Attorneys

United States Patent Office 3,078,598
Patented Feb. 26, 1963

3,078,598
PROCESS FOR MAKING RELIEF MAPS
Albert Ernest Goodson, 47 Lovelace Gardens,
Surbiton, England
Filed Sept. 7, 1960, Ser. No. 54,427
Claims priority, application Great Britain Sept. 10, 1959
7 Claims. (Cl. 35—41)

The invention relates to an improved process for making relief maps.

Heretofore in the making of relief maps it has been the practice to produce a relief model by building this up with laminations corresponding in outline with the contours of a contoured map and by the use of modelling materials such as plaster or papier mache. The model is then photographed with oblique lighting to produce a photograph with hill shading effects.

The object of the present invention is to provide a process for producing an improved relief model both quickly and simply, direct from air photographs and without the necessity of contour information.

A further object of the invention is to provide an improved process for making relief maps.

According to the invention a process for putting into relief a map marked on a sheet of transparent or translucent ductile material consists in placing said sheet on a resilient surface, outlining by indenting predetermined parts of said map, reversing the sheet on said surface and depressing other predetermined parts of the map out of the plane of the sheet.

Further according to the invention a process for making relief maps consists in the steps of printing or drawing a map on a sheet of transparent or translucent ductile material, placing said sheet on a resilient surface, outlining by indenting predetermined parts of said map, reversing the sheet on said surface, depressing other predetermined parts of the map out of the plane of the sheet and photographing the modelled sheet with oblique lighting.

In order that the invention may be more readily understood reference will be made to the accompanying drawings which illustrate by way of example, the steps in a preferred process.

Figure 2:
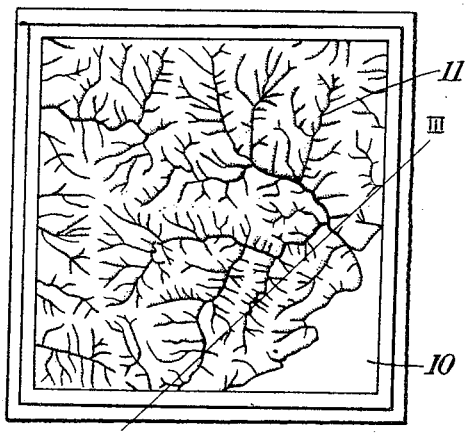
Figure 3:
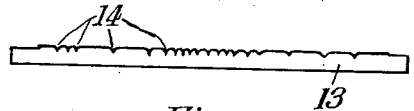
Figure 4:
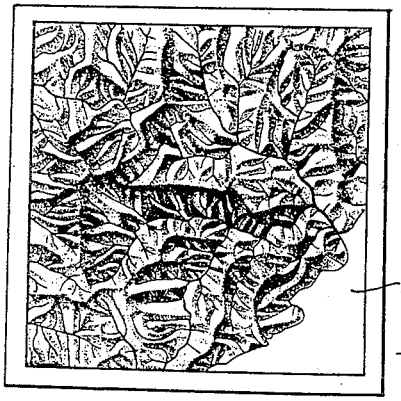

In the drawings:

FIG. 1 is a plan view of a tracing on a sheet of translucent ductile material of an air photograph viewed stereoscopically and which it is desired to put into relief, FIG. 2 is a plan view of the same sheet as that illustrated in FIG. 1 showing it as it would appear after one stage of processing, but with the dotted lines omitted for clarity, FIG. 3 is a section on the line III—III of FIG. 2 and showing a resilient pad on which the sheet has been processed, FIG. 4 is a plan view of the same sheet as that illustrated in FIGS. 1, 2 and 3 after a further stage of processing, but with the sheet reversed so that the opposite side is uppermost during the further processing.

Figure 5:

FIG. 5 is an elevation of the sheet shown in FIG. 4.

In the preferred process a map or the like, to be put into relief is traced in outline or otherwise produced from an air photograph, on a sheet 10, see FIG. 1, of translucent ductile material. The sheet 10 is formed from a sheet of synthetic resinous material having a thickness of about .005 to .007 of an inch, and for example, may comprise a sheet of the material known under the registered trademark "Astrofoil." Preferably the map is marked on the sheet 10 in two contrasting colours, all the land drainage features such as rivers, valleys, or the like being in one colour, represented by solid lines 11, and water sheds, mountain ranges and like features being in another colour, shown by dotted lines 12. The marked sheet 10 is then placed on a resilient felt base 13, see FIG. 3, which is preferably made of tightly compressed fibres so as to present a fairly hard surface.

The sheet 10 is then worked upon with a pointed instrument, such land drainage features as rivers, valleys, fissures or the like, which are represented by one colour as shown by the full lines 11, being heavily outlined by indenting the sheet. FIGS. 2 and 3 show the positive or upper side of the sheet 10 mounted on a felt base 13 and as it would appear after the said indenting has been effected. The indentations in the sheet seen at 14 in FIG. 3 represent the complete dentritic drainage system, for example, valleys, rivers and secondary and tertiary streams.

When said outlining is completed the sheet 10 is reversed on the felt pad 13 and raised ground such as watersheds, mountain ranges, cliffs and hills which have been represented by another colour as shown by the dotted lines 12, is pushed out of the plane of the sheet by working upon selected areas with suitable tools. For example, well defined low relief ridges may be formed by single strokes of a tool, whilst larger masses such as mountains of higher relief may be modelled by successive applications of pressure applied from the base of the land mass upwardly.

FIGS. 4 and 5 again show the positive or upper side of the same sheet 10 after a further reversal, all the deformations would have been made during the second stage of processing now appearing in relief as seen more clearly in FIG. 5.

It will be noted that the land drainage features shown below the normal plane of the sheet, see FIGS. 2 and 3, have been pushed to the same side of the sheet as the watershed features, whilst the latter are being formed, the distinction between hills and valleys being obtained entirely by varying the degree to which different parts of the sheet are pushed into relief.

The tools used for indenting and working the sheet should have smooth rounded working ends to prevent scratching or piercinng of the sheet material. Normally three tools are sufficient, one with a fine rounded tip for outlining the drainage features, one with a thicker and blunter tip and preferably of softer material, for modelling and filling out the body of hills or blunting sharp ridges, and one with a bent flat head, which can be used to burnish out tool marks and to press down small areas of the sheet when this is being mounted.

In order to achieve a reasonable degree of planimetric accuracy, the modelled sheet is fixed in register on a base on which such features as major junctions, coastlines and the like which appear on the modelled sheet, have already been marked. The fixing of the modelled sheet to the said base is effected by applying adhesive to the marginal areas of the sheet, to those areas thereon which are at the mean ground level as represented by undeformed parts of the sheet and to corresponding areas on the base. Once the marginal areas have been securely fastened to the said base, those flat areas to which adhesive has been applied are pressed down on to the base and located so that the corresponding markings on the sheet and base are in register.

The fixing of the marginal areas of the modelled sheet imprisons a quantity of air between the sheet and the base and by further manipulation of the sheet the captive air can be directed into selected areas or pockets increasing the relief where required. If desired a modelling substance such as that known under the brand name "Plasticine," which has been well kneaded can be positioned on the base board, prior to mounting the sheet.

Initially the modelling substance should be in excess of the required height on the base so that it will adapt itself to the modelled sheet when this is worked upon.

Prior to the modelled sheet being photographed it may be further treated by the addition of various materials to selected areas, so that when photographed the said areas simulate the actual topographical features of the ground. For example, bouldered areas may be represented by the application of coarse sand. After said treatment the modelled sheet is sprayed with a white coating.

The finished sheet is then photographed by one of a number of known photographic methods using oblique lighting. One such method may however consist in illuminating the sheet with mercury vapour discharge tubes located at a low angle in relation to the model and on the north west side of the map thereon. A double or triple photographic exposure is then made from the same side of the sheet as the light source, the oblique angle of the light source being altered between exposures, from very low, to slightly higher and to slightly higher again, this has the effect of intensifying the shadows of the higher relief, whilst preserving the detail within the shadows, and at the same time adequately showing very small, low features.

Owing to the minute detail which can be fashioned into the modelled sheet it is possible to obtain photographs also showing fine detail and photographs which will tolerate enlargement.

What I claim as my invention and desire to secure by Letters Patent is:

1. A process for making relief maps comprising the steps of marking a map on a sheet of translucent ductile material, placing said sheet on a resilient surface, outlining by indenting predetermined parts of said map, reversing the sheet on said surface, depressing other predetermined parts of the map out of the plane of the sheet, while viewing the marked map through said sheet in one of said two last-mentioned steps, photographing the modelled sheet with oblique lighting and reproducing the photographs obtained.

2. A process for making relief maps comprising the steps of marking a map on a sheet of translucent ductile material, placing said sheet on a felt pad, outlining by indenting predetermined parts of said map, reversing the sheet on said pad, depressing other predetermined parts of the map out of the plane of the sheet, while viewing the marked map through said sheet in one of said two last-mentioned steps, treating the modelled sheet by the addition of selected materials so that when photographed said areas simulate topographical features of the ground, illuminating the modelled sheet from a source of light arranged at a low angle in relation thereto and on the north west side of the map and photographing the modelled sheet from the same side of the sheet as said light source.

3. A process as claimed in claim 2 wherein said sheet is photographed with a multiple photographic exposure.

4. A process for putting into relief a map marked on a sheet of transparent or translucent ductile material comprising the steps of placing said sheet on a resilient surface, outlining by indenting predetermined parts of said map, reversing the sheet on said surface and depressing other predetermined parts of the map out of the plane of the sheet in the opposite direction of said first indented part while viewing the marked map through said sheet in one of said two last-mentioned steps.

5. A process for putting into relief a map marked on a sheet of transparent or translucent ductile material comprising the steps of placing said sheet on a resilient surface, outlining by indenting those features of said map representing land drainage, reversing the sheet on said surface and depressing those features of said map representing raised ground out of the plane of the sheet in the opposite direction to said first indented parts while viewing the marked map through said sheet in one of two last-mentioned steps.

6. A process for making relief maps comprising the steps of marking a map on a sheet of translucent ductile material, the land drainage features of the map being marked in one color and raised ground such as watersheds and like features being marked in another color, placing said sheet on a resilient surface, outlining by indenting the parts of said map in one color, reversing the sheet on said surface so that said indented parts project upwardly from the sheet and depressing the parts of said map in the other color out of the plane of the sheet, while viewing the marked map in one of said last-mentioned steps.

7. A process for putting into relief a map marked on a sheet of translucent ductile material, comprising the steps of placing said sheet on a resilient surface, outlining by indenting predetermined parts of said map, reversing the sheet on said surface so that said indented parts project upwardly from the sheet, depressing other predetermined parts of the map out of the plane of the sheet and in the opposite direction to said first indented parts, while viewing the marked map through said sheet in one of said two last-mentioned steps, applying adhesive to the marginal areas of the underside of the sheet and to those areas thereon which are at lowest ground level as represented by underformed parts of the sheet, fixing said adhesive treated areas and parts to a base on which selected points have been marked with features on said sheet, so that the same features on sheet and base can be brought into register, and further manipulating said sheet by directing air imprisoned between said sheet and base into selected areas to increase the relief where required.

References Cited in the file of this patent

UNITED STATES PATENTS

| | | |
|---|---|---|
| 1,393,255 | Wenschow | Oct. 11, 1921 |
| 1,980,981 | Cooke | Nov. 20, 1934 |
| 2,616,198 | Sewell | Nov. 4, 1952 |
| 2,694,634 | Debenham | Nov. 16, 1954 |
| 2,706,309 | Lampman | Apr. 19, 1955 |